July 26, 1960 — D. S. BAKER — 2,946,428
BELT
Filed Feb. 5, 1957
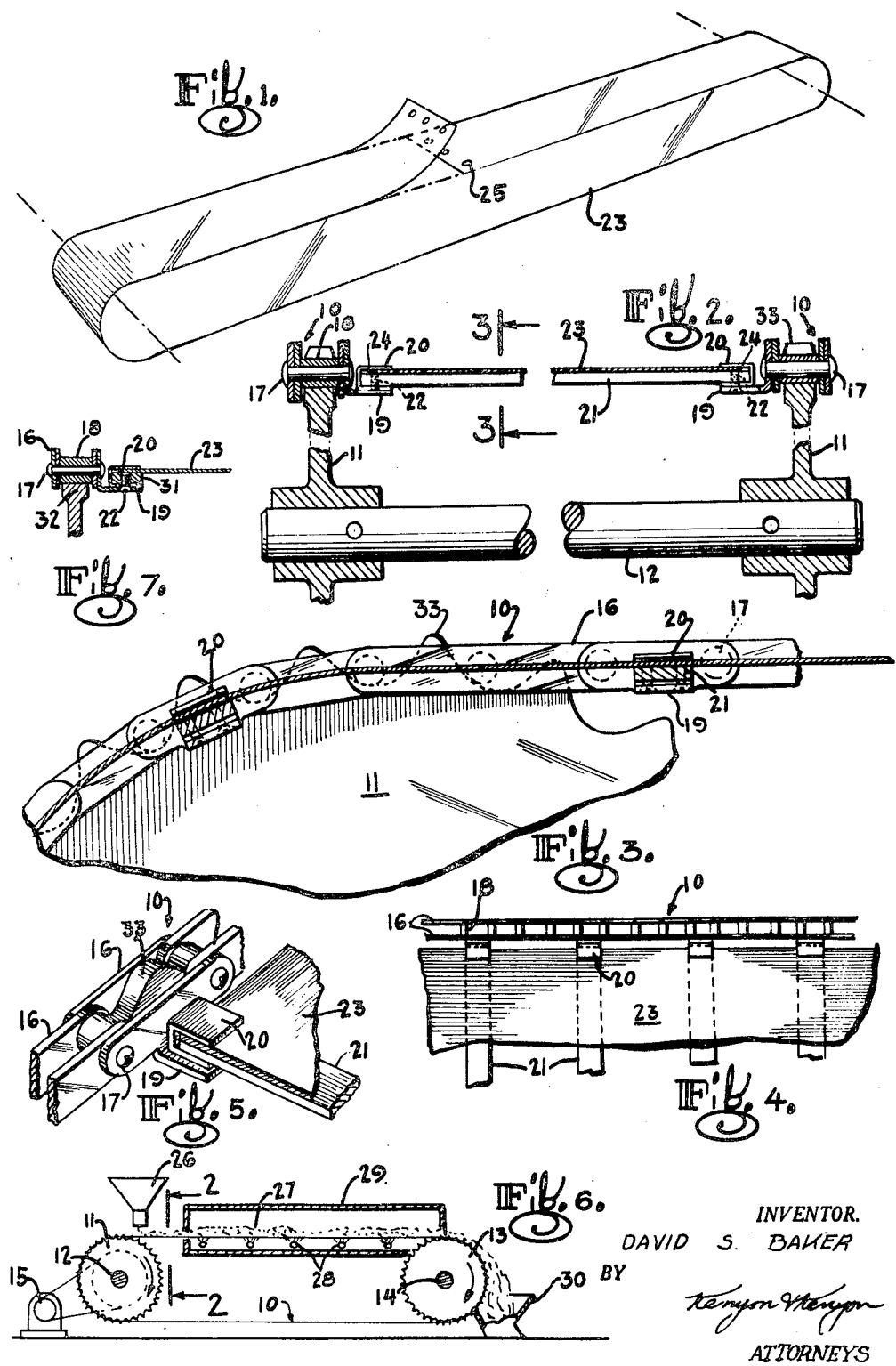
INVENTOR.
DAVID S. BAKER
BY
Kenyon & Kenyon
ATTORNEYS

2,946,428
BELT

David S. Baker, 475 5th Ave., New York, N.Y.

Filed Feb. 5, 1957, Ser. No. 638,308

7 Claims. (Cl. 198—193)

This invention relates to belts and relates more particularly to traveling belt apparatus for providing a moving support useful for various purposes and in various types of processing and other equipment.

The principal object of this invention is to provide a continuous belt, preferably composed of materials such as sheet metal, e.g., stainless steel, which is economical to manufacture and install, and which is capable of being maintained in alignment for travel in a predetermined orbit during continuous operation over long periods of time.

Heretofore attempts have been made to utilize the advantages of a material such as a strip of stainless steel sheet material in the form of a belt for the provision of a moving support for carrying materials either with or without incidental processing such as drying, heating or the like. These attempts have been in the direction of providing spaced drums having parallel axes and about which the strip of stainless steel sheet material is disposed as a continuous belt. In installing such equipment great care has to be exercised in joining the ends of the sheet material for the provision of the continuous belt, for if the ends are not secured with extreme exactness the tension adjacent opposite margins of the belt will be sufficiently unequal to cause crawl of the belt with reference to axial direction of one or both of the drums. Such accurate butt welding or riveting has been accomplished, but it is a precision operation requiring very great skill and entailing a very substantial amount of expense. However, even when such great care is exercised in the precision manufacture of steel belt, the difficulty due to crawl lengthwise of the drum is not overcome. In order to obtain the desired traction, the belt has to be carried quite snugly in contact with the peripheral surfaces of the drums and even the slightest dimensional variation will result in objectionable crawl. For example, such slight causes as accumulation of dust from the air on the surface of one or both of the drums may result in such dimensional variation that crawl will result even though the variation is not otherwise appreciable except for the crawl induced thereby during continuous operation of the belt. Because of these circumstances, installations utilizing a belt of the type referred to have been equipped with some suitable self-acting correctional device. Stationary guides are unsatisfactory because sheet metal thin enough to flex around a drum is too thin to be pushed back into position. It curls up at the edges. Furthermore, the tension and friction produced by the end drums makes lateral movement of the belt almost impossible. Electronic devices also have been used that function in relation to the disposition of one or both of the margins of the belt so that whenever the belt crawls from the orbital position to be maintained a suitable correctional mechanism is brought into play for restoring the belt to its desired position. The correctional device may operate to swing one of the drums used for carrying the belt about an axis normal to the rotational axis of the drum to a sufficient, but slight, extent for accomplishing the correction. In practice, such a correctional mechanism functions most of the time so as to provide an interplay between a marginal feeling or sighting means and the means for counteracting crawl by adjustment of the axis of one of the drums.

An object and feature of this invention is the provision of a continuous belt such as a belt of sheet steel which can be readily manufactured without precision techniques and which is not subject to crawl, with the result that auxiliary equipment for counteracting crawl may be dispensed with altogether.

Features and objects of this invention relate to the provision of belt means in two parts which travel together, one part being a continuous flexible belt carrier means and the other being a continuous flexible belt means comprising either a single element or a plurality of elements that is carried by and with the belt carrier means in laterally slidable relation therewith but under restraint provided by guide means secured to the belt carrier in proximate abutting relation to the opposite margins of the belt means for limiting the lateral sliding movements of the belt means relative to the belt carrier.

More particularly, features and objects of this invention relate to the provision of a flexible belt carrier presenting a belt-supporting surface and means for mounting the belt carrier for travel of the belt-supporting surface thereof in an orbit together with flexible belt means supported by the belt-supporting surface of the carrier for travel of the belt means in the orbit of the belt-supporting surface of the carrier in unattached relation thereto along the opposite margins thereof, confining means being provided in secured relation to the carrier for confining the belt means adjacent the margins thereof while at the same time permitting a certain amount of play between the carrier and the belt means while they are moving together at substantially the same speed.

Further objects and features of this invention relate to the provision of equi-length flexible members such as sprocket chains which are mounted for travel in the same direction in spaced parallel orbits, these members providing belt-carrying rails for carrying belt means adjacent the margins thereof as by the provision of a succession of belt-carrying lugs which support the opposite margins of the belt means but are unattached thereto so as to permit relative sliding movements while at the same time providing marginal confining means, which, however, permit a substantial amount of lateral play.

In certain constructions, the continuous flexible members which travel in the same direction in spaced parallel orbits may be joined by a succession of crossbars which assist in providing support for the belt means in a manner which is desirable for belts of considerable width. For narrower belts the crossbar means is not essential.

It is important that the length of travel of the continuous flexible members such as sprocket chains be substantially the same as the length of travel of the belt means so that the belt-carrying means and the belt means may travel together in aligned orbits and at substantially the same rate. This means, in the case of a sprocket chain, for example, which may comprise a succession of links pivotally connected for articulation about spaced transverse parallel axes, that the belt means is carried along the opposite margins thereof, as by the employment of lugs secured at intervals to the chain links, so that the thickness of the belt means is disposed substantially in alignment with the pivotal axes at which the chain links are connected together and so that the belt and the axes of the pivotal connections for the chain links move in substantially aligned and like orbits, each moving at substantially the same speed throughout its orbit.

Further objects, features and advantages of this invention will be apparent from the following description of certain embodiments of this invention which are illustrative of preferred practice thereof in connection with the accompanying drawings, wherein:

Fig. 1 is a perspective view of a continuous belt means, made from sheet steel or the like;

Fig. 2 is a sectional elevation of the combined belt means and carrier therefor taken on the line 2—2 of Fig 6 and on a much larger scale;

Fig. 3 is a detail view partially in section taken on the line 3—3 of Fig. 2;

Fig. 4 is a detail plan view along one margin of the belt shown in Figs. 2 and 3;

Fig. 5 is a perspective detail view showing the means comprised in the carrier for supporting the belt means in unsecured, but confined, relation for travel with the belt-carrying means;

Fig. 6 is a schematic side elevation of the traveling belt apparatus of this invention which illustrates one manner of utilizing the belt in a processing apparatus; and Fig. 7 is a detail sectional view showing an alternative contruction for mounting one end of one of the continuous flexible members comprised in the traveling belt-carrying means.

In this embodiment of this invention shown in Figs. 1–6, the traveling carrier or cradle for the belt comprises a pair of sprocket chains 10 which are carried by a pair of sprocket wheels 11 mounted for rotation about the axis of the rotatable shaft 12 and another pair of sprocket wheels 13 secured to the shaft 14 whose axis is in spaced parallel relation to the axis of the rotatable shaft 12. The pair of sprocket wheels 11 may be driven from a suitable source of power such as the motor 15 for effecting travel of the sprocket chains in the same direction and at the same rate.

Each of the sprocket chains 10 is composed of a succession of links 16, as shown most clearly in Fig. 5, which are pivotally connected for articulation about a succession of transverse parallel axes by means of the pins 17. Between the links the rollers 18 provide spacing means for the links 16 and anti-friction rolling contact with the teeth 33 presented by the sprocket wheel.

Along each of the sprocket chains 10 there is a succession of laterally disposed offset lugs 19 which, in the embodiment shown, are integral with a succession of spaced links. To each lug 19 there is secured a U-shaped part 20 which has one end of each of the successive crossbars 21 penetrating therein, both being secured to the lugs 19 by the screws 22.

The parts thus far described provide the belt-carrying means which is mounted so that the sprocket chains 10 rotate in the same direction in spaced parallel orbits. The belt, which serves the function of a traveling support, may be in the form of a continuous band 23 of a material such as stainless steel. The belt 23 has its opposite margins 24 slightly spaced from the innermost portion of the inner surface of the U-shaped parts 20, i.e., slightly spaced from the bottoms of the recesses provided by the U-shaped parts 20, the belt 23 being supported by the belt-supporting surfaces provided by the crossbars 21 in unsecured relation thereto so that the belt 23 is in laterally slidable relation with respect to the crossbars 21 as well as all other parts of the belt-carrying means. However, the innermost portion of the inner surface of the U-shaped parts 20 provide guide means in proximate abutting relation to the opposite margins of the belt for limiting lateral sliding movements of the belt 23 relative to the crossbars 21. A portion of the U-shaped part 20 overlies the belt 23 so as to provide retaining means so that the margins of the belt 23 are confined between the crossbars 21 and the overlying portions of the U-shaped parts 20. Such confining means is much to be preferred, although for small installations such confining means could be dispensed with and one may rely solely on the guide means that restrains the lateral sliding movements relative to the crossbars 21.

The belt 23 may consist of a single continuous band of sheet material such as stainless steel. Because of the manner by which this belt is carried, the abutting ends of the band may or may not be secured together. When the U-shaped parts 20 comprise overlying retaining means as aforesaid, the retaining means serve to confine the ends of the belt when the ends of the belt are disposed with a substantial overlap. Ordinarily, however, the ends of the belt are secured together, but it is an advantage of this invention that such securement need not resort to the highly precision techniques heretofore employed. For example, a plurality of rivets 25 having countersunk heads may be employed and are all that is necessary.

During operation of the composite belt of this invention the belt-carrying means comprising the sprocket chains 10, the oppositely disposed U-shaped parts 20 and the crossbars 21 travel in an orbit prescribed by the pairs of sprocket wheels 11 and 13. These parts provide a carriage or cradle which is independently rotatable in an orbit. However, the carriage or cradle provided by these parts support and carry the belt 23 in unsecured relation therewith and at the same speed. Because the belt 23 is unsecured to the carriage with which it rotates, and is traveling at the same speed, no difficulty is encountered from any tendency of the belt 23 to crawl laterally in either direction. The belt 23 rotates with the carriage or cradle therefor without the necessity for any correction devices such as those which have been found indispensable in installations employing a continuous belt of sheet metal or similar material.

While the belt of sheet metal ordinarily is in the form of a continuous band, except for the zone where the ends abut one another, the belt means may comprise a plurality of shorter sections which may or may not be joined to one another in the regions where the portions of the band abut each other.

An illustration of a typical use of traveling belt apparatus embodying this invention is schematically indicated in Fig. 6. Thus material to be treated may be deposited on the belt from a feeding device 26. The sprocket wheels 11 are driven in the direction shown by the arrow, with the result that the material 27 deposited on the belt is carried by the belt while supported thereon. While supported thereon, the material 27 may be subjected to any desired influence such as heat supplied by burners 28 while the material is traveling through an enclosure 29 which may, for example, be a drying chamber or an oven. After treatment, the material may be discharged into a receiving hopper 30. Of course, there are many other possible applications of a belt embodying this invention which may range from heavy equipment for transporting materials such as coal to small installations suitable for feeding small quantities of material.

In Fig. 7 an alternative embodiment of this invention is illustrated. In ordinary practice in the case of belts of substantial width, it is preferable to employ the crossbars 21 so as to provide support for preventing sagging of the belt 23. However, since the continuous flexible members in the form of sprocket chains travel in fixed orbits determined by the sprocket wheels, the traveling carriage for the belt may be provided without utilizing the crossbars 21. It is feasible to omit the crossbars 21, especially when small quantities of material are to be handled which do not require a long span between opposite margins of the traveling belt.

In Fig. 7 the crossbars 21 are omitted and, instead, the opposite margins of the belt 23 rest on the small belt support members 31. Where the reference characters in Fig. 7 are the same as those employed in Figs. 1–6, the parts correspond to the smilarly numbered parts in Figs. 1–6.

It is not essential that the sprocket chain be guided by sprocket wheels. Thus instead of the sprocket wheels 13, a fixed track 32 may be employed against which the rollers 18 ride in rolling contact. Especially when some contour other than a true arc is desired the employment of a track 32 which serves as a guide for the sprocket chain may be resorted to. Whether the path of the belt and carrier therefor is that illustrated in Fig. 6 or follows some other course, the path is referred to herein as an orbit.

While this invention has been described in connection with certain specific embodiments thereof, it is to be understood that this has been done for illustrative purposes and that the construction of the parts may take different forms for effecting the objects and realizing the features of this invention that have been described and exemplified herein.

I claim:

1. Traveling belt apparatus comprising a continuous flexible belt carrier presenting belt-supporting surface, means for mounting said belt carrier for travel of said surface in an orbit at substantially the same speed throughout, a continuous flexible sheet metal belt carried by said supporting surface of said belt carrier in laterally slidable relation therewith throughout the entire length of said belt means for travel in said orbit, and means secured to said carrier for limiting lateral sliding movements of said belt relative to said carrier while permitting a substantial amount of lateral play, said belt consisting essentially solely of a plain sheet metal band of constant width and presenting essentially flat upper and under surfaces, said belt being carried by said belt carrier essentially solely by the under surface of said belt resting on said belt-supporting surface, and said belt being in unsecured relation with said belt-supporting surface throughout the entire extent thereof.

2. Traveling belt apparatus comprising a pair of equi-length continuous flexible members, means for mounting said members for travel in the same direction in spaced parallel orbits, a continuous substantially flat flexible sheet metal belt, belt-supporting means secured to said members which support said belt substantially in alignment with said orbits, said belt being in laterally slidable relation throughout its entire length with respect to said supporting means therefor, and guide means secured to said members disposed in proximate abutting relation to said margins of said belt leaving a substantial amount of play for lateral sliding movements of said belt relative to said supporting means, said belt consisting essentially solely of a plain sheet metal band, said belt-supporting means presenting belt-supporting surface for supporting contact with the under surface of said belt, and said belt having under surface thereof that merely rests on said belt-supporting surface of said belt-supporting means and being in unsecured relation with said belt-supporting means throughout the entire extent of said belt.

3. Traveling belt apparatus comprising a pair of equi-length flexible members, means for mounting said members for travel in the same direction in spaced parallel orbits, a continuous flexible sheet metal belt, belt-supporting and -positioning means secured to said members said belt-supporting and -positioning means presenting belt-supporting surface that underlies said belt in unsecured supporting contact therewith permitting lateral movements of said belt relative to said belt-supporting surface and that supports said belt in substantial alignment with said orbits and said belt-supporting and -positioning means presenting recesses substantially flush with the margins of said belt to receive the opposite margins of said belt therein substantially in alignment with said orbits, the opposite margins of said belt being received in said recesses in laterally slidable relation throughout the entire length of said belt means leaving a substantial but limited amount of play between said margins of said belt and the bottoms of said recesses.

4. Traveling belt apparatus comprising a pair of equi-length continuous flexible members, means for mounting said members for travel in the same direction in spaced parallel orbits, a continuous substantially flat flexible sheet metal belt, a succession of spaced belt-supporting bars secured to and extending transversely between said members which present surfaces that support said belt substantially in alignment with said orbits, said belt being in unsecured slidable relation throughout its entire length with respect to said members and to said support bars, and guide means secured to said members disposed in proximate spaced relation to the opposite margins of said belt for limiting lateral sliding movements of said belt relative to said supporting bars and said members, said belt consisting essentially solely of a plain sheet metal band completely free throughout other than for its being supported as aforesaid by said support bars and for its having its lateral sliding movements relative to said support bars limited as aforesaid by said guide means.

5. Traveling belt apparatus which comprises a pair of equi-length sprocket chains comprising a succession of links pivotally connected to each other adjacent the opposite ends thereof for articulation about transverse axes, rollers mounted for rotation about said axes, means comprising a pair of coaxial sprocket wheels disposed in spaced parallel planes over which said sprocket chains, respectively, pass for mounting said chains for travel of said axes in the same direction in spaced parallel orbits, a succession of belt-carrying lugs secured to said links of said chains in oppositely disposed relation and presenting belt-supporting surfaces, a continuous sheet metal belt supported along the opposite margins thereof by said surfaces in slidable relation therewith throughout its entire length with said belt substantially in alignment with said axes, and a succession of crossbars presenting supporting surface substantially in alignment with the belt-supporting surfaces of said lugs each extending from one of said lugs in one of said chains to an oppositely disposed lug in the other chain, guide means secured to said lugs in proximate abutting relation to the opposite margins of said belt leaving substantial play for lateral sliding movements of said belt relative to said supporting surfaces of said lugs, and retainer means secured to said links in opposed spaced relation to said supporting surfaces of said lugs for accommodating the opposite margins of said belt between said retainer means and the supporting surfaces of said lugs, said retainer means being limited in extent to the regions of said belt immediately adjacent said margins thereof.

6. Traveling belt apparatus which comprises a pair of equi-length continuous chains comprising a succession of links pivotally connected for articulation about a succession of spaced transverse parallel axes, means for mounting said chains for travel of said axes in the same direction in spaced parallel orbits, a flexible sheet metal belt, a succession of belt-carrying lugs secured to said links of said chains, belt support means comprising said lugs presenting belt-supporting surface underlying said belt and that supports said belt in substantial alignment with said axes, said belt being in unsecured relation to said belt support means and in laterally slidable relation to said belt-supporting surface throughout the entire length of said belt, and guide means secured to said links disposed in proximate abutting relation to said margins of said belt leaving substantial play for lateral sliding movements of said belt relative to said belt support means.

7. Traveling belt apparatus which comprises a pair of equi-length sprocket chains comprising a succession of links pivotally connected to each other adjacent the opposite ends thereof for articulation about transverse axes, means comprising a pair of coaxial sprocket wheels disposed in spaced parallel planes over which said sprocket chains, respectively, pass for mounting said chains for travel of said axes in the same direction in spaced parallel orbits, a succession of belt-carrying lugs secured to said links of said chains in oppositely disposed relation and presenting belt-supporting surfaces, a continuous sheet metal belt supported along the opposite margins thereof by said surfaces in slidable relation therewith throughout its entire length with said belt substantially in alignment with said axes, and a succession of crossbars presenting supporting surface substantially in alignment with the belt-supporting surfaces of said lugs each extending from one of said lugs in one of said chains to an oppositely disposed lug in the other chain, guide means secured to said lugs in proximate abutting relation to the opposite margins of said belt leaving substantial play for lateral sliding movements of said belt relative to said supporting surfaces of said lugs, and retainer means secured to said links in opposed spaced relation to said supporting surfaces of said lugs for accommodating the opposite margins of said belt between said retainer means and the supporting surfaces of said lugs, said retainer means being limited in extent to the regions of said belt immediately adjacent said margins thereof.

References Cited in the file of this patent

UNITED STATES PATENTS

| | | |
|---|---|---|
| 389,261 | Sutherland | Sept. 11, 1888 |
| 809,827 | Lucas | Jan. 9, 1906 |
| 1,155,340 | Davis | Oct. 5, 1915 |
| 1,559,772 | Peale | Nov. 3, 1925 |
| 2,751,065 | Thomson | June 19, 1956 |

FOREIGN PATENTS

| | | |
|---|---|---|
| 512,827 | Canada | May 17, 1955 |